United States Patent
Ahn et al.

(10) Patent No.: US 12,335,537 B2
(45) Date of Patent: Jun. 17, 2025

(54) METHOD AND APPARATUS FOR POINT CLOUD CODING USING MAPPING FUNCTION

(71) Applicants: HYUNDAI MOTOR COMPANY, Seoul (KR); KIA CORPORATION, Seoul (KR); DIGITALINSIGHTS INC., Seoul (KR)

(72) Inventors: Yong Jo Ahn, Seoul (KR); Jong Seok Lee, Seoul (KR); Seung Wook Park, Yongin-si (KR)

(73) Assignees: HYUNDAI MOTOR COMPANY, Seoul (KR); KIA CORPORATION, Seoul (KR); DIGITALINSIGHTS INC., Seoul (KR)

( * ) Notice: Subject to any disclaimer, the term of this patent is extended or adjusted under 35 U.S.C. 154(b) by 52 days.

(21) Appl. No.: 18/202,801

(22) Filed: May 26, 2023

(65) Prior Publication Data
US 2023/0300382 A1     Sep. 21, 2023

Related U.S. Application Data

(63) Continuation of application No. PCT/KR2021/017971, filed on Dec. 1, 2021.

(30) Foreign Application Priority Data

Dec. 1, 2020   (KR) .................. 10-2020-0165724
Dec. 1, 2021   (KR) .................. 10-2021-0169666

(51) Int. Cl.
*H04N 19/85*      (2014.01)
*H04N 19/124*     (2014.01)
(Continued)

(52) U.S. Cl.
CPC .......... *H04N 19/85* (2014.11); *H04N 19/124* (2014.11); *H04N 19/136* (2014.11);
(Continued)

(58) Field of Classification Search
CPC ...... G06T 9/00; H04N 19/124; H04N 19/136; H04N 19/60; H04N 19/85; H04N 19/186; H04N 19/597
See application file for complete search history.

(56) References Cited

U.S. PATENT DOCUMENTS 10,778,979 B2    9/2020   Ramasubramonian et al.
10,861,196 B2    12/2020  Mammou et al.
(Continued)

FOREIGN PATENT DOCUMENTS

KR    20200007734 A    1/2020
KR    20200039757 A    4/2020
(Continued)

OTHER PUBLICATIONS

Li Cui et al., Palette-based Color Attribute Compression for Point Cloud Data, KSII Transactions on Internet and Information Systems vol. 13, No. 6, Jun. 2019; 13 pp.
(Continued)

*Primary Examiner* — Md N Haque
(74) *Attorney, Agent, or Firm* — Lempia Summerfield Katz LLC

(57) ABSTRACT

The present disclosure relates to a point cloud coding device and a method using a mapping function. The point cloud coding device and method compress attribute values of a point cloud by generating a piecewise linear function that is a nonlinear mapping function based on a distribution of the attribute values. The point cloud coding device and method map the attribute values to values within a limited range by utilizing the nonlinear mapping function.

14 Claims, 12 Drawing Sheets

(51) Int. Cl.
*H04N 19/136* (2014.01)
*H04N 19/186* (2014.01)
*H04N 19/597* (2014.01)
*H04N 19/60* (2014.01)

(52) U.S. Cl.
CPC ......... *H04N 19/186* (2014.11); *H04N 19/597* (2014.11); *H04N 19/60* (2014.11)

(56) References Cited

U.S. PATENT DOCUMENTS

| | | |
|---|---|---|
| 11,151,748 B2 | 10/2021 | Chang et al. |
| 11,461,935 B2 | 10/2022 | Mammou et al. |
| 12,069,316 B2 | 8/2024 | Oh |
| 2019/0080483 A1 | 3/2019 | Mammou et al. |
| 2019/0215517 A1 | 7/2019 | Ramasubramonian et al. |
| 2020/0020132 A1 | 1/2020 | Sinharoy et al. |
| 2020/0043199 A1* | 2/2020 | Chang .............. G06T 9/001 |
| 2021/0118190 A1 | 4/2021 | Mammou et al. |
| 2022/0159312 A1 | 5/2022 | Oh |
| 2022/0239946 A1* | 7/2022 | Park .............. H04N 19/60 |
| 2022/0353548 A1* | 11/2022 | Oh .............. G06T 9/40 |
| 2023/0099049 A1 | 3/2023 | Mammou et al. |
| 2023/0419554 A1* | 12/2023 | Chen .............. G06T 9/001 |

FOREIGN PATENT DOCUMENTS

| | | |
|---|---|---|
| KR | 20200107965 A | 9/2020 |
| WO | 2020190093 A1 | 9/2020 |

OTHER PUBLICATIONS

3DG; V-PCC codec description; ISO/IEC JTC 1/SC 29/WG 11; No. 19526; Oct. 2020; 73 pp.

European Search report cited in European patent application No. 21900991.7; Oct. 8, 2024; 7 pp.

* cited by examiner

METHOD AND APPARATUS FOR POINT CLOUD CODING USING MAPPING FUNCTION

CROSS-REFERENCE TO RELATED APPLICATIONS

This application is a Continuation of International Application No. PCT/KR2021/017971 filed on Dec. 1, 2021, which claims priority to Korean Patent Application No. 10-2020-0165724 filed on Dec. 1, 2020, and Korean Patent Application No. 10-2021-0169666 filed on Dec. 1, 2021, the entire disclosures of which are incorporated herein by reference.

TECHNICAL FIELD

The present disclosure relates to a to a point cloud coding apparatus and a method using a mapping function.

BACKGROUND

The statements in this section merely provide background information related to the present disclosure and do not necessarily constitute prior art.

Mapping techniques are used for data compression in areas, such as video, point cloud, and the like. In general, mapping techniques can be utilized in encoding for pre-processing or in decoding for post-processing. Various mapping functions exist for mapping, including linear mapping functions, such as the one illustrated in FIG. 1, which is widely used.

Data acquired by a given sensor is typically represented as floating-point numbers. Whereas, common data compression methods support data represented as integers. This requires most sensor data acquisition devices to map the acquired data into a range that can be represented by the bit depth supported by these compression methods. If the average minimum and maximum values of the data acquired from the sensor are known, as well as the minimum and maximum values supported by the subsequent compression method, the acquired data can be mapped using a linear mapping function such as the example in FIG. 1. Here, the linear mapping function can map the acquired data to a smaller range than the original range or can map it more efficiently to improve coding efficiency.

The more uniform the distribution of the acquired data, the better the linear mapping function can perform in terms of coding efficiency. However, attribute information, which is the target of point cloud coding, entails the difficulty of ensuring the uniformity of its distribution. Therefore, to improve the coding efficiency of point cloud coding, there is a need for mapping functions that can be applied to information with non-uniform distribution, such as attribute information.

SUMMARY

The present disclosure in some embodiments seeks to provide a point cloud coding apparatus and a method using a mapping function for compressing attribute values of a point cloud. The point cloud coding apparatus and method generate a piecewise linear function that is a nonlinear mapping function based on a distribution of the attribute values and map the attribute values to values within a limited range by utilizing the nonlinear mapping function.

At least one aspect of the present disclosure provides a method performed by a point cloud decoding apparatus by decoding attribute information of a set of points. The method includes obtaining a bitstream of the attribute information. The method also includes generating reconstructed attribute information by decoding and inverse quantizing the bitstream of the attribute information. The method also includes generating mapping attribute information by reverse mapping the reconstructed attribute information by using a mapping function received from a high level. The method also includes generating output attribute information from the mapping attribute information by performing a color-space inverse conversion and a dynamic range inverse scaling.

Another aspect of the present disclosure provides an attribute information decoding device for decoding attribute information of points. The attribute information decoding device includes a bitstream separation unit configured to separate a bitstream of the attribute information. The attribute information decoding device also includes a reconstruction attribute generation unit configured to generate reconstructed attribute information by decoding and de-quantizing the bitstream of the attribute information. The attribute information decoding device also includes an attribute reverse mapping unit configured to generate mapping attribute information by reverse mapping the reconstructed attribute information by using a mapping function received from a high level. The attribute information decoding device also includes an output attribute generation unit configured to generate output attribute information from the mapping attribute information by performing a color-space inverse conversion and a dynamic range inverse scaling.

Yet another aspect of the present disclosure provides a method performed by a point cloud encoding apparatus for encoding attribute information of a set of points. The method includes obtaining the attribute information of the points. The method also includes generating calibrated attribute information from the attribute information by performing a dynamic range scaling and a color space conversion. The method also includes generating a mapping function based on features of the calibrated attribute information. The method also includes generating, by using the mapping function, mapped attribute information by forward mapping the calibrated attribute information. The method also includes generating a bitstream of the attribute information by quantizing and encoding the mapped attribute information.

As described above, the present embodiment provides a point cloud coding apparatus and a method for generating a piecewise linear function that is a nonlinear mapping function based on a distribution of the attribute values of a point cloud. The point cloud coding apparatus and method map the attribute values to values within a limited range by utilizing the nonlinear mapping function, to improve the coding efficiency of the point cloud.

DETAILED DESCRIPTION

Figure 1:
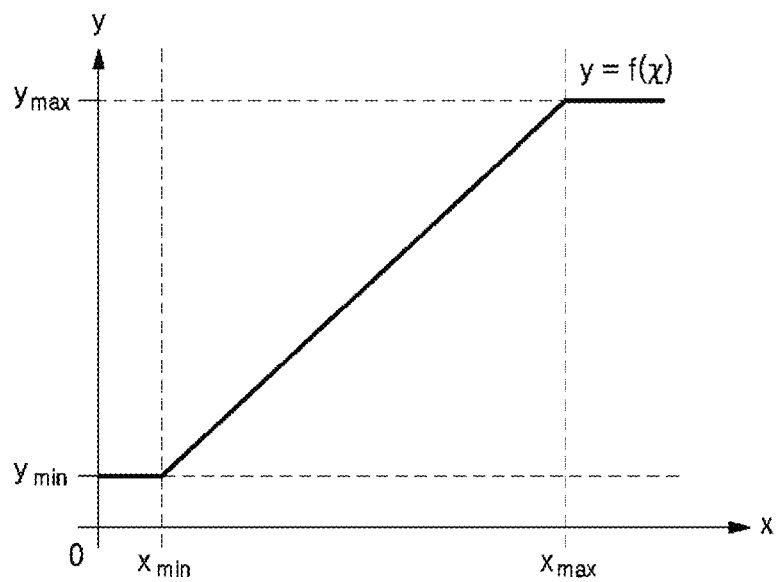
FIG. 1 is a diagram illustrating a linear mapping function, according to at least one embodiment of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure have been omitted for the purpose of clarity and for brevity. When a component, device, element, or the like of the present disclosure is described as having a purpose or performing an operation, function, or the like, the component, device, element, or the like should be considered herein as being "configured to" meet that purpose or to perform that operation or function. Each of the component, device, element, and the like may separately embody or be included with a processor and a memory, such as a non-transitory computer readable media, as part of the apparatus.

The present disclosure relates to a point cloud coding device and a method utilizing a mapping function. More specifically, the point cloud coding device and method are provided for generating a piecewise linear function as a nonlinear mapping function based on a distribution of attribute values in a point cloud. The point cloud coding device and method map the attribute values to values within a limited range by utilizing the generated nonlinear mapping function.

The points in the point cloud may be compressed by a point cloud encoding device and then may be stored and transmitted in the form of a bitstream. To enable a human or machine to utilize the point cloud data, a point cloud decoding device may reconstruct the points in the point cloud from the bitstream.

In the following description, a point cloud encoding device and an encoding device may be used interchangeably, and a point cloud decoding device and a decoding device may be used interchangeably.

Figure 2:
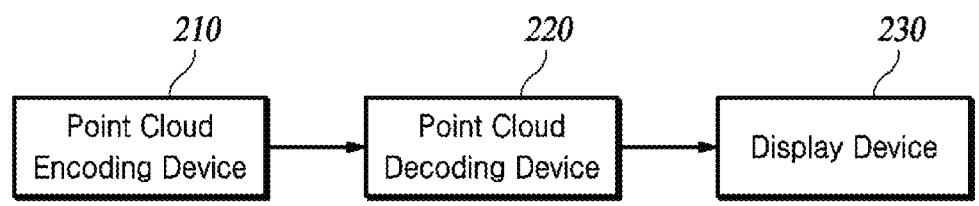
FIG. 2 is a conceptual block diagram illustrating a system for displaying a point cloud, according to at least one embodiment of the present disclosure.

FIG. 2 is a conceptual block diagram illustrating a system for displaying a point cloud, according to at least one embodiment of the present disclosure.

A system for displaying a point cloud according to at least one embodiment of the present disclosure may include a point cloud encoding device 210, a point cloud decoding device 220, and a display device 230 in whole or in part. Such a system may further include a sensor device (not shown) that generates the point cloud and a storage device (not shown) for storing bitstreams.

The point cloud encoding device 210 encodes the point cloud obtained from the sensor device to generate a bitstream. The point cloud encoding device 210 may store the bitstream in a storage device or transmit it to the point cloud decoding device 220.

Meanwhile, the point cloud includes geometric information representing locations, such as x, y, and z. Further, the point cloud may include attribute information. Here, the attribute information may include color information such as RGB, YCbCr, etc. The attribute information may include lidar-related information, such as reflectance, depth, and the like. Further, the attribute information may include a combination of various information such as frame index, point acquisition time, etc.

The point cloud decoding device 220 may decode the received bitstream to reconstruct the point cloud. The reconstructed point cloud may be delivered to the display device 230.

The display device 230 may project the point cloud, which is three-dimensional data, into a two-dimensional domain to output points represented in two dimensions. The display device 230 may utilize a three-dimensional display, such as a holographic display, to represent the points. Alternatively, the display device 230 may generate surfaces and lines by using the points and attribute information that are three-dimensional data and may represent the points based on rendering and output them on a display.

As described above, since the point cloud includes geometric information, which is the location data of the points, and attribute information, which is the attribute values of the points, the point cloud encoding device 210 may first perform encoding of the geometric information, and then perform encoding of the attribute information.

Hereinafter, the point cloud encoding device 210 is described with reference to FIGS. 3-5.

Figure 3:
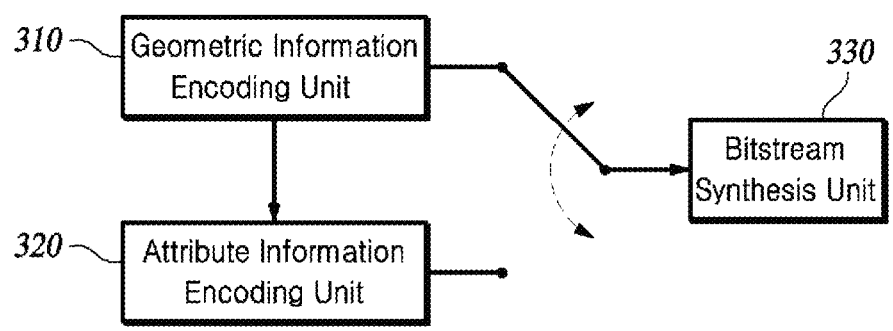
FIG. 3 is a conceptual block diagram illustrating a point cloud encoding device according to at least one embodiment of the present disclosure.

FIG. 3 is a conceptual block diagram illustrating a point cloud encoding device according to at least one embodiment of the present disclosure.

The point cloud encoding apparatus 210 according to this embodiment may include all or part of a geometric information encoding unit 310, an attribute information encoding unit 320, and a bitstream synthesis unit 330.

The geometric information encoding unit 310 encodes geometric information of points to generate a bitstream. The geometric information encoding unit 310 delivers the generated bitstream to the bitstream synthesis unit 330. The geometric information encoding unit 310 may also reconstruct the geometric information of the points from the bitstream and deliver the reconstructed geometric information to the attribute information encoding unit 320.

The attribute information encoding unit 320 refers to the reconstructed geometric information and encodes the attribute information of the points to generate a bitstream. The attribute information encoding unit 320 delivers the generated bitstream to the bitstream synthesis unit 330.

The bitstream synthesis unit 330 synthesizes the bitstream of geometric information and the bitstream of attribute information to generate a single bitstream. The bitstream synthesis unit 330 may store the single bitstream in a storage device or transmit it to the point cloud decoding device 220. In this case, if no attribute information is present, the point cloud encoding device 220 can only generate a bitstream of geometric information.

Figure 4:
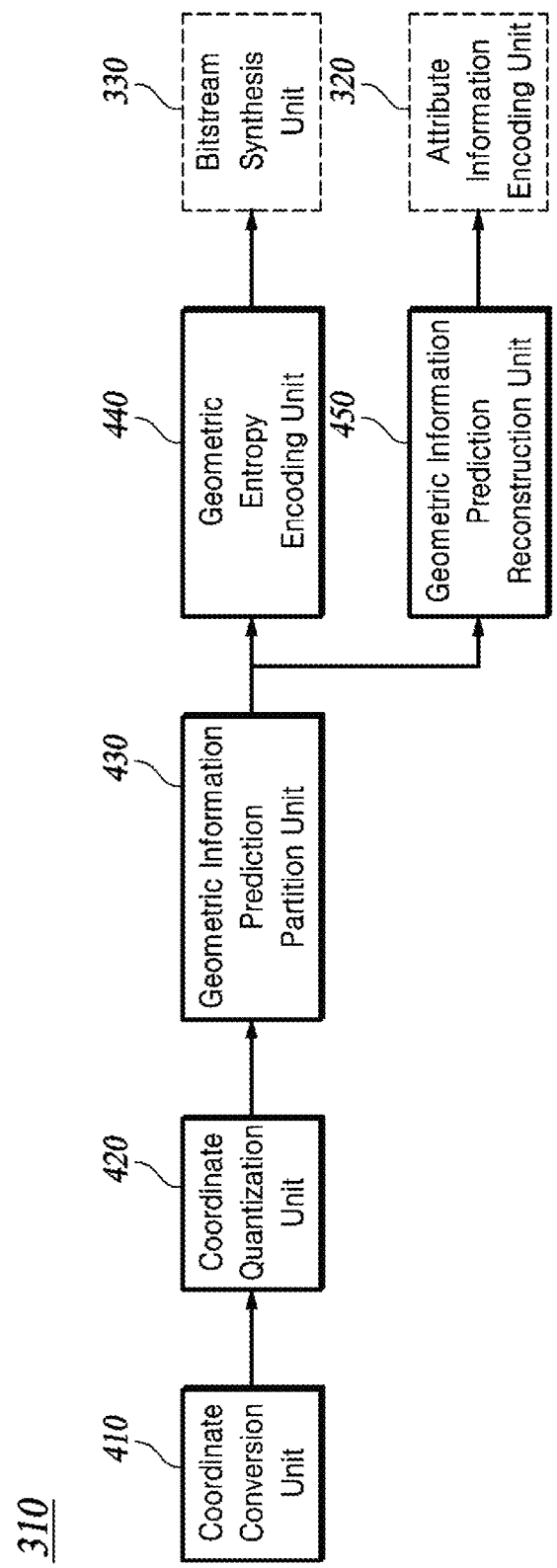
FIG. 4 is a conceptual block diagram illustrating a geometric information encoding unit according to at least one embodiment of the present disclosure.

FIG. 4 is a conceptual block diagram illustrating a geometric information encoding unit according to at least one embodiment of the present disclosure.

The geometric information encoding unit 310 according to at least one embodiment of the present disclosure may include a coordinate conversion unit 410, a coordinate quantization unit 420, a geometric information prediction partition unit 430, a geometric entropy encoding unit 440, and a geometric information prediction reconstruction unit 450 in whole or in part.

The coordinate conversion unit 410 converts geometric information of points in world coordinates to information represented in an internal coordinate system for encoding. The coordinate conversion unit 410 delivers the converted geometric information to the coordinate quantization unit 420.

The coordinate quantization unit 420 quantizes the converted geometric information into data in an integer coordinate system used within the encoding device 210. The coordinate quantization unit 420 delivers the quantized geometric information to the geometric information prediction partition unit 430.

The geometric information prediction partition unit 430 predicts, partitions, and symbolizes the quantized geometric information. Here, the symbolized geometric information may be partitioning information of points (e.g., octree, quadtree, binary tree, kd-tree, predictive tree, etc.). The geometric information prediction partition unit 430 may deliver the symbolized geometric information to the geometric entropy encoding unit 440 and the geometric prediction reconstruction unit 450.

The geometric entropy encoding unit 440 generates a bitstream from the geometric information symbolized based on entropy coding. The geometric entropy encoding unit 440 may deliver the generated bitstream to the bitstream synthesis unit 330.

The geometric information prediction reconstruction unit 450 secondly predicts and reconstructs the symbolized geometric information to generate the reconstructed geometric information. The geometric information prediction reconstruction unit 450 may deliver the reconstructed geometric information to the attribute information encoding unit 320.

Figure 5:
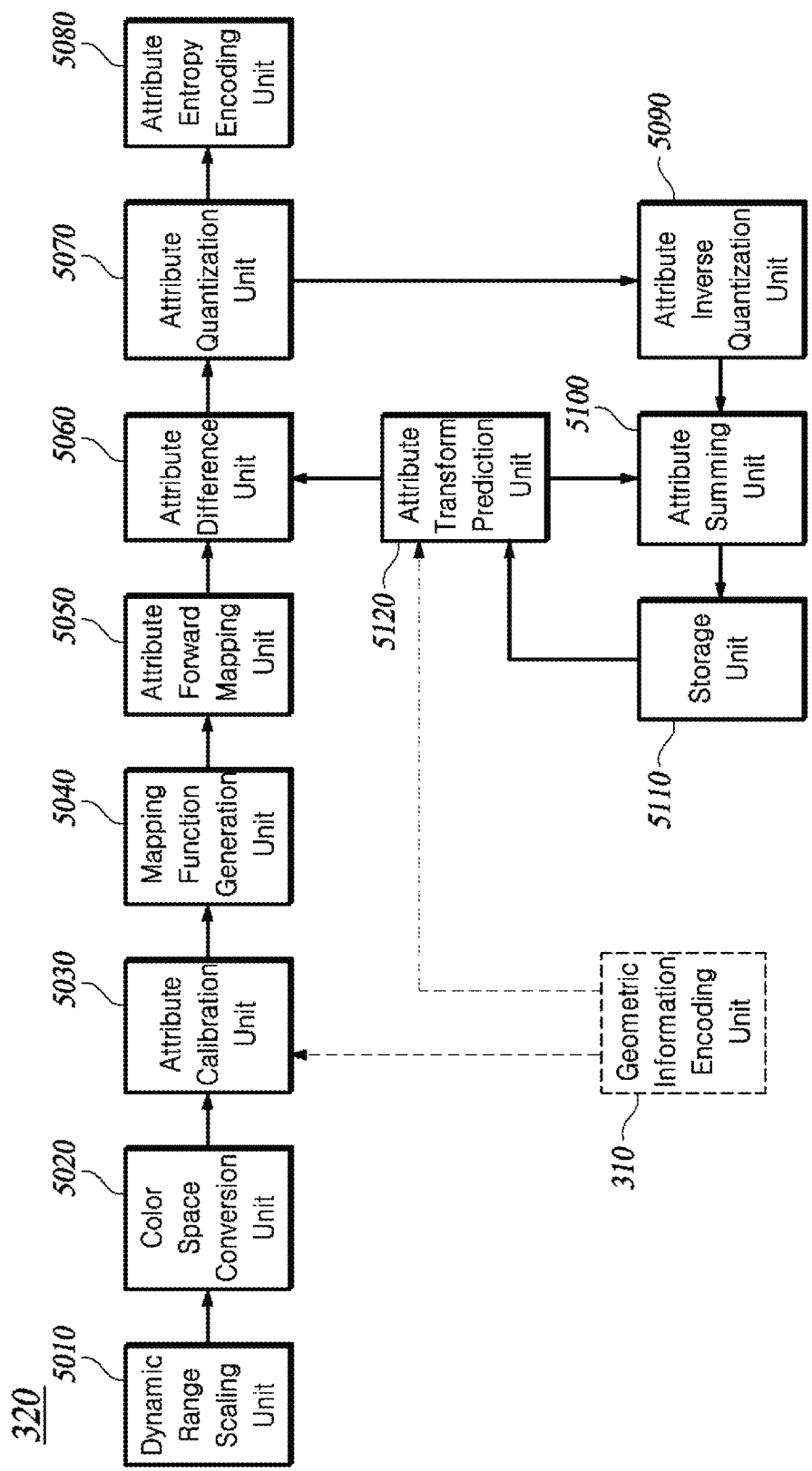
FIG. 5 is a conceptual block diagram illustrating an attribute information encoding unit according to at least one embodiment of the present disclosure.

FIG. 5 is a conceptual block diagram illustrating an attribute information encoding unit according to at least one embodiment of the present disclosure.

The attribute information encoding unit 320 according to this embodiment includes: a dynamic range scaling unit 5010; a color space conversion unit 5020; an attribute calibration unit 5030; a mapping function generation unit 5040; an attribute forward mapping unit 5050; an attribute difference unit 5060; an attribute quantization unit 5070; an attribute entropy encoding unit 5080; an attribute inverse quantization unit 5090; an attribute summing unit 5100; a storage unit 5110; and an attribute transform prediction unit 5120.

The dynamic range scaling unit 5010 scales the dynamic range of the attribute information of the points. The dynamic range scaling unit 5010 delivers the attribute information with its dynamic range scaled to the color space conversion unit 5020.

The color space conversion unit 5020 converts the attribute information, if it is RGB color information, to color information in another color space, such as YUV, YCbCr, YCgCo, or the like. The color space conversion unit 5020 delivers the converted attribute information to the attribute calibration unit 5030. Alternatively, when the attribute information is a type that is not related to a color space, such as reflectance, frame index, point acquisition time, etc., the color space conversion unit 5020 may deliver the attribute information to the attribute calibration unit 5030 without performing a color space conversion.

The attribute calibration unit 5030 obtains the attribute information from the color space conversion unit 5020 and the reconstructed geometric information from the geometric information encoding unit 310. The attribute calibration unit 5030 may calibrate the attribute information to reflect the changed geometric information of the reconstructed points. Using the geometry and attribute information of the original points and the geometry information of the reconstructed points, the attribute calibration unit 5030 may calibrate the attribute information of the reconstructed points. The attribute calibration unit 5030 delivers the calibrated attribute information to the mapping function generation unit 5040.

The mapping function generation unit 5040 generates a mapping function based on the features of the attribute information of the points. The features of the attribute information may include, for example, a color space of the attribute information, type of the attribute information, a distribution of the attribute information, a histogram of the attribute information, features extracted by applying a filter to the attribute information, and the like. The mapping function generation unit 5040 delivers the generated mapping function to the attribute forward mapping unit 5050. Alternatively, the mapping function may be included in information from a high level, such as a sequence parameter set (SPS) or an attribute parameter set (APS). Such information from a high level may be encoded into a bitstream by the attribute entropy encoding unit 5080 and sent to the decoding device 220.

The mapping function may be a linear function, as illustrated in FIG. 1. The mapping function may also be a nonlinear function based on parameters. Alternatively, the mapping function may be a piecewise linear function with N (where N is a natural number) intervals. When the mapping function is a piecewise linear function, the mapping function generation unit 5040 can take advantage of the interval-specific features to generate a linear function for each interval. In this case, each interval's linear function may be correlated with the linear functions of neighboring intervals.

Figure 6:
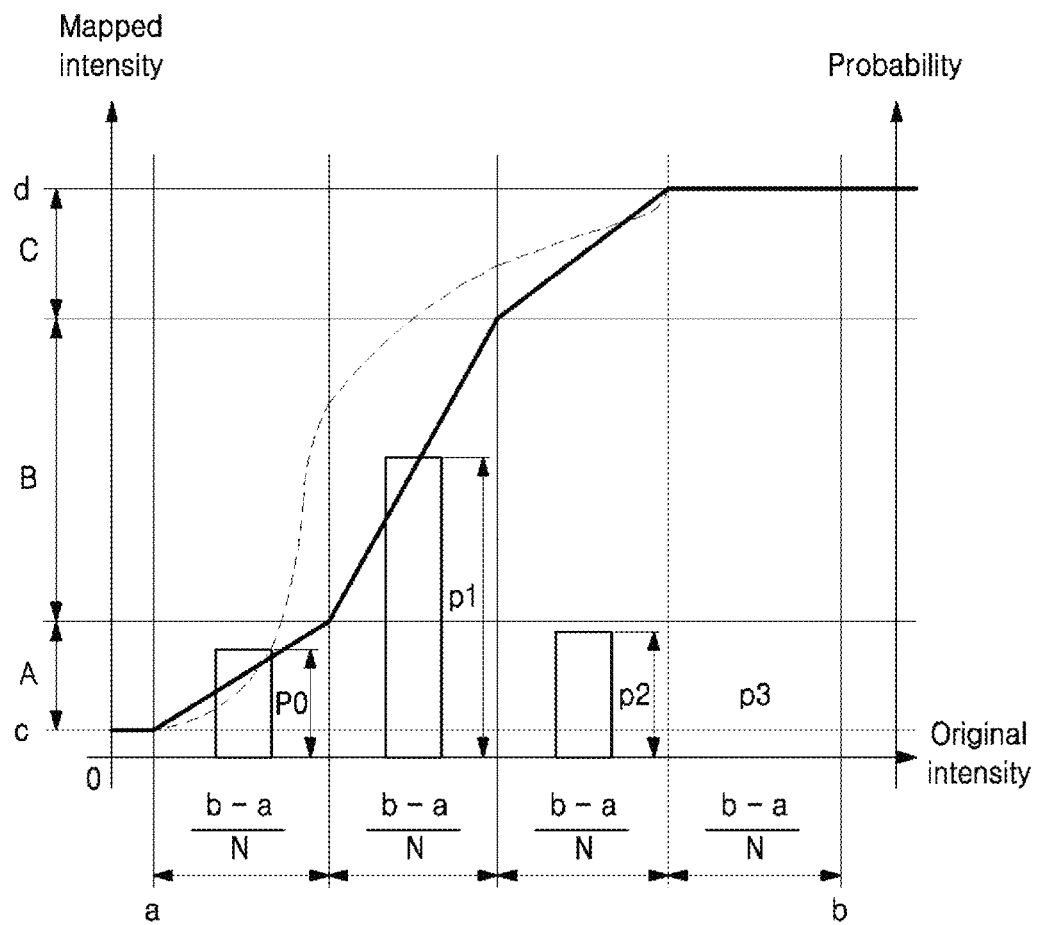
FIG. 6 is a diagram illustrating a piecewise linear function as a mapping function according to at least one embodiment of the present disclosure.

FIG. 6 is a diagram illustrating a piecewise linear function as a mapping function according to at least one embodiment of the present disclosure.

The mapping function generation unit 5040 may generate a mapping function based on a histogram of the attribute information. The mapping function generation unit 5040 may calculate or determine the slope of the mapping function based on a ratio of the number of points included in each of the intervals. The mapping function generation unit 5040 may generate a piecewise linear function by concatenating interval-specific slopes, as illustrated in FIG. 6.

The mapping function generation unit 5040 may define a histogram of the attribute information as a probability density function (PDF), accumulate these PDFs to generate a cumulative distribution function (CDF), and use the generated CDF as a mapping function.

The mapping function generation unit 5040 may calculate interval-specific slope values based on the interval-specific probability value of the PDF and based on the dynamic range available for the attribute information encoding unit 320 and then may generate a mapping function by concatenating the interval-specific slopes.

The mapping function generation unit 5040 divides the dynamic range "a to b" of the original intensity into N intervals having the same length, as illustrated in FIG. 6. The mapping function generation unit 5040 may calculate the length of the N intervals in the mapped intensity by using at least one of the ratio of the number of points included in each interval, the dynamic range of the original intensity, and the dynamic range "c to d" of the mapped intensity. The mapping function generation unit 5040 may calculate the slope of each interval from the ratio between the interval length of the original intensity and the interval length of the mapped intensity and then may generate a mapping function by concatenating the interval-specific slopes.

When the type of attribute information is reflectance meaning the reflectivity obtained by the lidar, the same object may exhibit similar values. For example, when lidar is used in autonomous driving to detect objects on the road, the number of detected objects may be small, so the dynamic range of attribute information may be very small. Therefore, the mapping function generation unit 5040 can encode the attribute information more efficiently by mapping the attribute information to a small dynamic range and then encoding the mapped attribute information by using a piecewise linear function.

The attribute forward mapping unit 5050 maps the attribute information of all points by using the mapping function received from the mapping function generation unit 5040. The attribute forward mapping unit 5050 transfers the mapped points to the attribute difference unit 5060.

The attribute difference unit 5060 generates residual attribute information by subtracting the predicted attribute information obtained from the attribute transform prediction unit 5120 from the mapped attribute information obtained from the attribute forward mapping unit 5050. The attribute difference unit 5060 delivers the residual attribute information to the attribute quantization unit 5070.

The attribute quantization unit 5070 quantizes and symbolizes the residual attribute value obtained from the attribute difference unit 5060 by using quantization parameters. The attribute quantization unit 5070 transmits the symbolized attribute information to the attribute entropy encoding unit 5080. The attribute quantization unit 5070 may also transmit the symbolized attribute information to the attribute inverse quantization unit 5090.

The attribute entropy encoding unit 5080 generates a bitstream by entropy coding all the information obtained from the attribute quantization unit 5070. The attribute entropy encoding unit 5080 delivers the generated bitstream to the bitstream synthesis unit 330.

The attribute inverse quantization unit 5090 generates reconstructed residual attribute information by de-quantizing the symbolized attribute information obtained from the attribute quantization unit 5070 by using quantization parameters. The attribute inverse quantization unit 5090 delivers the reconstructed residual attribute information to the attribute summing unit 5100.

The attribute summing unit 5100 generates the reconstructed attribute information by summing the reconstructed residual attribute information obtained from the attribute inverse quantization unit 5090 and the predicted attribute information obtained from the attribute transform prediction unit 5120. The attribute summing unit 5100 may store the reconstructed attribute information of the points in the storage unit 5110.

The storage unit 5110 stores the reconstructed attribute information of all points.

The attribute transform prediction unit 5120 generates the predicted attribute information of the points by using the reconstructed geometric information obtained from the geometric information encoding unit 310 and the reconstructed attribute information of the points stored in the storage unit 5110. To generate the predicted attribute information, the attribute transform prediction unit 5120 may utilize the partition structure or level of detail (LOD) in the reconstructed geometric information. The attribute transform prediction unit 5120 may generate the predicted attribute information by transforming the reconstructed attribute information by using an attribute information transform method referring to the reconstructed geometry information. Such attribute information transform methods include a region adaptive hierarchical transform (RAHT), a lifting transform, and a predicting transform. Here, the RAHT refers to the reconstructed geometric information, and the lifting and predicting transforms refer to LOD sampling of the reconstructed geometric information.

The attribute transform prediction unit 5120 may deliver the predicted attribute information to the attribute difference unit 5060 and the attribute summing unit 5100.

The attribute information transform methods as described above are not the point of the present disclosure and, therefore, a detailed description thereof has been omitted.

Figure 7:
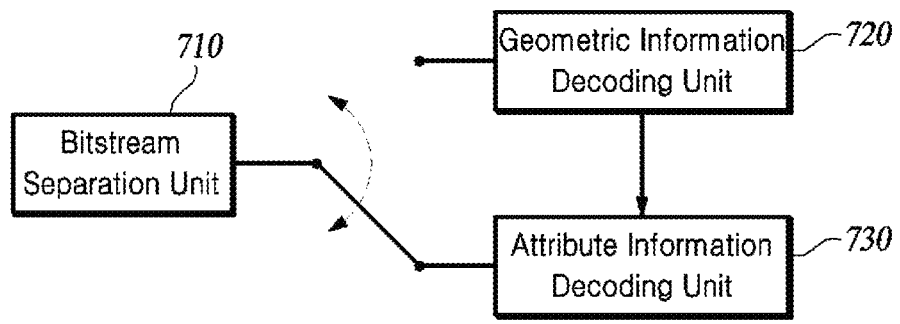
FIG. 7 is a conceptual block diagram illustrating a point cloud decoding device according to at least one embodiment of the present disclosure.
Figure 8:
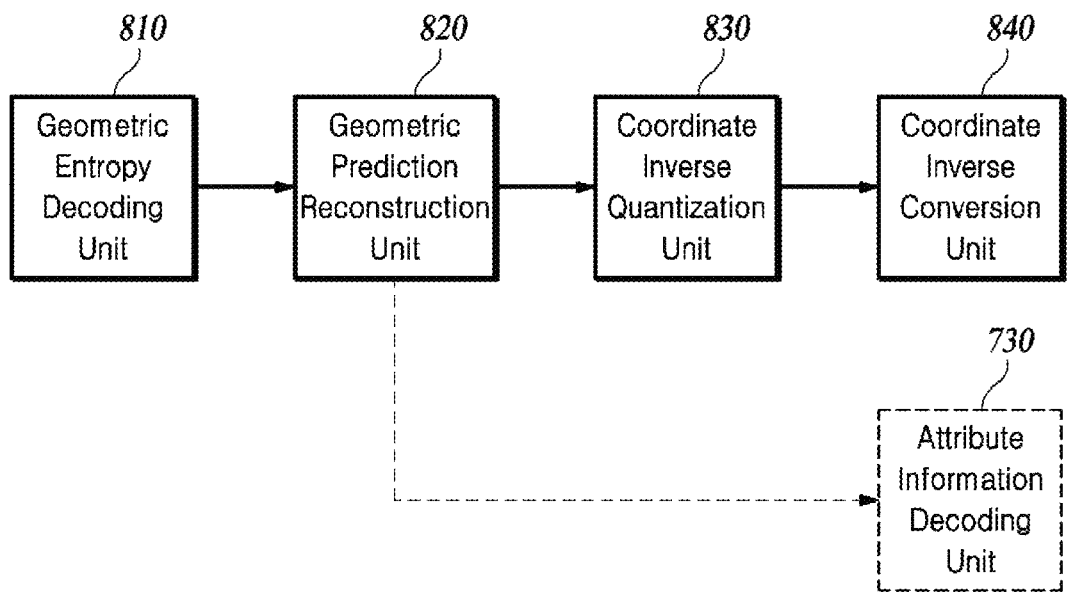
FIG. 8 is a conceptual block diagram illustrating a geometric information decoding unit according to at least one embodiment of the present disclosure.
Figure 9:
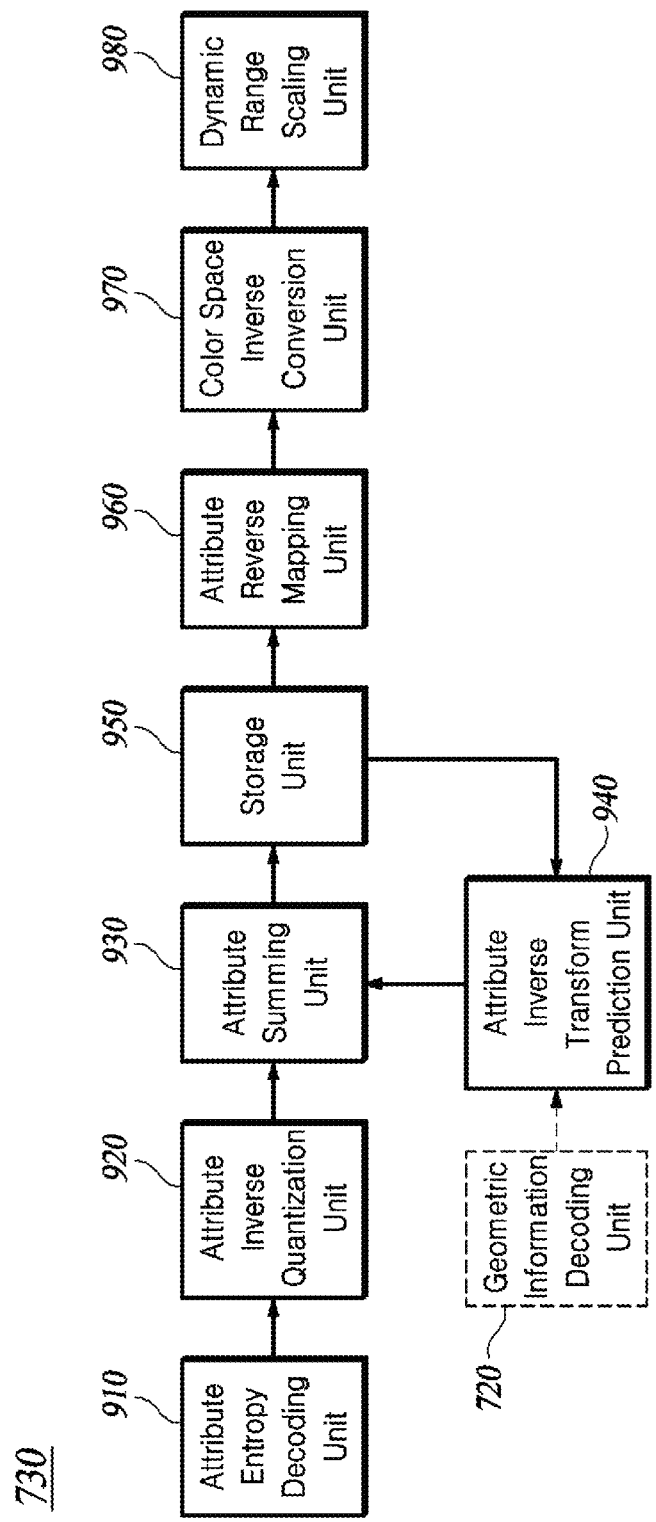
FIG. 9 is a conceptual block diagram illustrating an attribute information decoding unit according to at least one embodiment of the present disclosure.

The following describes a point cloud decoding device 220 with reference to FIGS. 7-9.

FIG. 7 is a conceptual block diagram illustrating a point cloud decoding device according to at least one embodiment of the present disclosure.

The point cloud decoding device 220 according to this embodiment may include a bitstream separation unit 710, a geometric information decoding unit 720, and an attribute information decoding unit 730 in whole or in part.

The bitstream separation unit 710 splits the bitstream received from the attribute information encoding device 210 into a bitstream of geometric information and a bitstream of attribute information. The bitstream separation unit 710 delivers the bitstream of geometric information to the geometric information decoding unit 720 and delivers the bitstream of attribute information to the attribute information decoding unit 730.

The geometric information decoding unit 720 decodes the bitstream of geometric information to generate reconstructed geometric information. The geometric information decoding unit 720 transfers the reconstructed geometric information to the attribute information decoding unit 730.

The attribute information decoding unit 730 reconstructs the attribute information by using the bitstream of the attribute information and the reconstructed geometric information. At this time, when no bitstream of the attribute information exists, the point cloud decoding device 220 may only generate the geometric information.

FIG. 8 is a conceptual block diagram illustrating a geometric information decoding unit according to at least one embodiment of the present disclosure.

The geometric information decoding unit 720 according to the present embodiment may include a geometric entropy decoding unit 810, a geometric prediction reconstruction unit 820, a coordinate inverse quantization unit 830, and a coordinate inverse conversion unit 840 in whole or in part.

The geometric entropy decoding unit 810 may decode a bitstream of geometric information to generate symbolized geometric information. Here, the symbolized geometric information may be partitioning information about points (e.g., octree, quadtree, binary tree, kd-tree, predictive tree, etc.). The geometric entropy decoding unit 810 delivers the symbolized geometric information to the geometric prediction reconstruction unit 820.

The geometric prediction reconstruction unit 820 reconstructs geometric information from the symbolized geometric information obtained from the geometric entropy decoding unit 810. The geometric prediction reconstruction unit 820 may reconstruct the geometric information by using a prediction method, such as a planar prediction, a neighboring prediction, or the like, based on the already reconstructed geometric information. The geometric prediction reconstruction unit 820 may deliver the reconstructed geometric information to the coordinate inverse quantization unit 830 and the attribute information decoding unit 730.

The coordinate inverse quantization unit 830 inversely quantizes the reconstructed geometric information in the integer internal coordinate system. The coordinate inverse quantization unit 830 delivers the inverse quantized geometric information to the coordinate inverse conversion unit 840.

The coordinate inverse conversion unit 840 utilizes the information on the world coordinate system transmitted from the high level to convert the coordinate system of the geometric information obtained from the coordinate inverse quantization unit 830, from the internal coordinate system to the world coordinate system. For example, the coordinate inverse conversion unit 840 generates geometric information converted into data in the world coordinate system.

FIG. 9 is a conceptual block diagram illustrating an attribute information decoding unit according to at least one embodiment of the present disclosure.

The attribute information decoding unit 730 according to this embodiment may include: an attribute entropy decoding unit 910; an attribute inverse quantization unit 920; an attribute summing unit 930; an attribute inverse transform prediction unit 940; a storage unit 950; an attribute reverse mapping unit 960; a color space inverse conversion unit 970; and a dynamic range scaling unit 980 in whole or in part.

The attribute entropy decoding unit 910 decodes the bitstream of attribute information to generate quantized residual attribute information. The attribute entropy decoding unit 910 delivers the quantized residual attribute information to the attribute inverse quantization unit 920.

The attribute inverse quantization unit 920 utilizes the quantization parameters for de-quantizing the quantized residual attribute information to reconstruct the residual attribute information. The attribute inverse quantization unit 920 delivers the reconstructed residual attribute information to the attribute summing unit 930.

The attribute summing unit 930 reconstructs the attribute information by summing the residual attribute information obtained from the attribute inverse quantization unit 920 and the predicted attribute information obtained from the attribute inverse transform prediction unit 940. The attribute summing unit 930 may store the reconstructed attribute information in the storage unit 950.

The storage unit 950 stores all of the attribute information received from the attribute summing unit 930 in memory. The points stored in the storage unit 950 may be used for prediction in the attribute inverse transform prediction unit 940 and may be delivered to the attribute reverse mapping unit 960 to generate the output attribute information.

The attribute reverse mapping unit 940 generates predicted attribute information of the points by using the reconstructed geometric information obtained from the geometric information decoding unit 720 and the reconstructed attribute information of the reconstructed points stored in the storage unit 950. To generate the predicted attribute information, the attribute inverse transform prediction unit 940 may utilize the partition structure or LOD in the reconstructed geometry information. The attribute inverse transform prediction unit 940 utilizes an attribute information transform method referencing the reconstructed geometry information for inversely transforming the reconstructed attribute information to generate the predicted attribute information.

The attribute inverse transform prediction unit 940 delivers the predicted attribute information to the attribute summing unit 930.

The attribute reverse mapping unit 960 reverse maps the reconstructed attribute information by using the mapping function delivered from the high level. Further, the attribute reverse mapping unit 960 may reverse map the reconstructed attribute information by using the reverse mapping function delivered from the high level. The mapping function delivered from the high level may be a linear function, a piecewise linear function, or a nonlinear function.

In another embodiment, the reverse mapping function may be in the form of or may use or refer to a look-up table (LUT).

In another embodiment, the decoding device 220 may derive the reverse mapping function by obtaining, from the high level, the forward mapping function calculated by the attribute information encoding device 210. Generally, the forward and reverse mapping functions have a one-to-one mapping relationship, which allows only one of the two mapping functions to be stored or transmitted and lets the decoding device 220 to derive the other as needed.

When the mapping function is a piecewise linear function, the linear function of each interval may be expressed as a slope or as an interval length in the mapped domain. Since the encoding device 210 has divided the intervals of the original domain into intervals of equal length, the decoding device 220 can derive the mapping function by obtaining the slope or interval length from the mapped domain.

Further, depending on the type of attribute information, the operation of the attribute reverse mapping unit 960 may be omitted. For example, when the type of attribute information is not reflectance or color information but frame index, point acquisition time, etc., a mapping may be advantageously saved for the sake of coding efficiency.

The attribute information reverse mapped by the attribute reverse mapping unit 960 is the attribute information mapped to the source domain. The attribute reverse mapping unit 960 delivers the reverse mapped attribute information to the color space inverse conversion unit 970.

The color space inverse conversion unit 970 inversely converts the color space of the reverse mapped attribute information. At this time, to inversely convert the color space, the color space inverse conversion unit 970 may use the original color space information delivered from the high level. Additionally, if the color space had not been converted in the encoding device 210, the operation of the color space inverse conversion unit 970 may be omitted. The operation of the color space inverse conversion unit 970 may also be omitted when the type of attribute information is not color information but reflectance, frame index, point acquisition time, etc. The color space inverse conversion unit 970 delivers the attribute information with its color space inverse converted to the dynamic range scaling unit 980.

The dynamic range scaling unit 980 utilizes the original dynamic range information received from the high level for scaling the attribute information obtained from the color space inverse conversion unit 970 to attribute information having the original dynamic range, thereby generating output attribute information.

Figure 10:
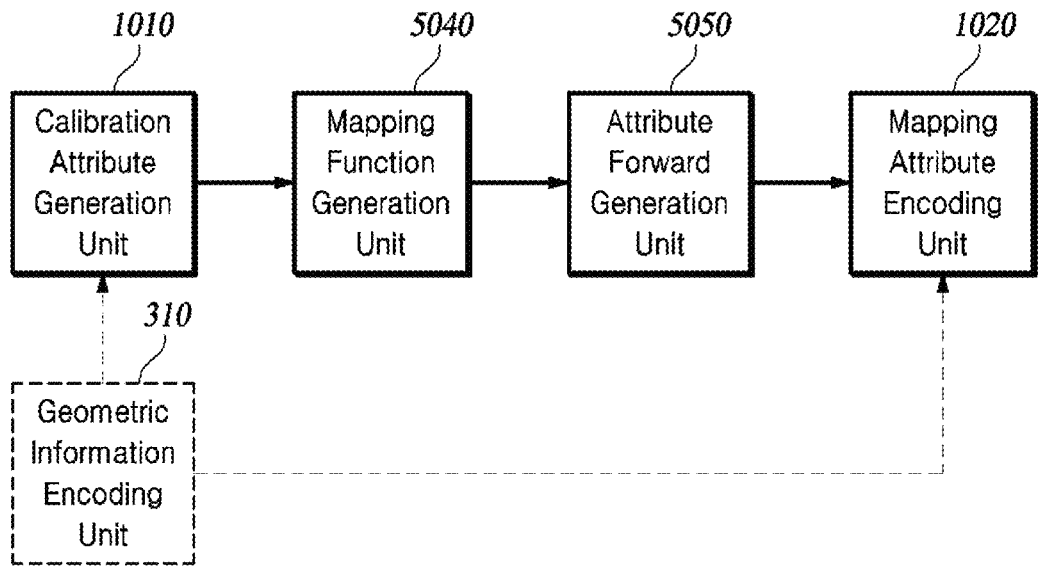
FIG. 10 is a conceptual block diagram illustrating an attribute information encoding unit according to another embodiment of the present disclosure.

FIG. 10 is a conceptual block diagram illustrating an attribute information encoding unit according to another embodiment of the present disclosure.

The attribute information encoding unit 320 according to the present embodiment may be expressed as centered on the attribute forward mapping unit 5050, as illustrated in FIG. 10. For example, the attribute information encoding unit 320 includes a calibration attribute generation unit 1010, a mapping function generation unit 5040, an attribute forward mapping unit 5050, and a mapping attribute encoding unit 1020. Here, the calibration attribute generation unit 1010 includes the dynamic range scaling unit 5010, the color space conversion unit 5020, and the attribute calibration unit 5030, as described above. The mapping attribute encoding unit 1020 includes the attribute difference unit 5060, the attribute quantization unit 5070, the attribute entropy encoding unit 5080, the attribute inverse quantization unit 5090, the attribute summing unit 5100, the storage unit 5110, and the attribute transform prediction unit 5120, as described above.

Accordingly, the calibration attribute generation unit 1010 generates calibrated attribute information from the attribute information by performing a color space conversion, a dynamic range scaling, and a calibration considering the reconstructed geometry information.

The mapping attribute encoding unit 1020 quantizes and encodes the mapped attribute information to generate a bitstream of the attribute information.

Figure 11:
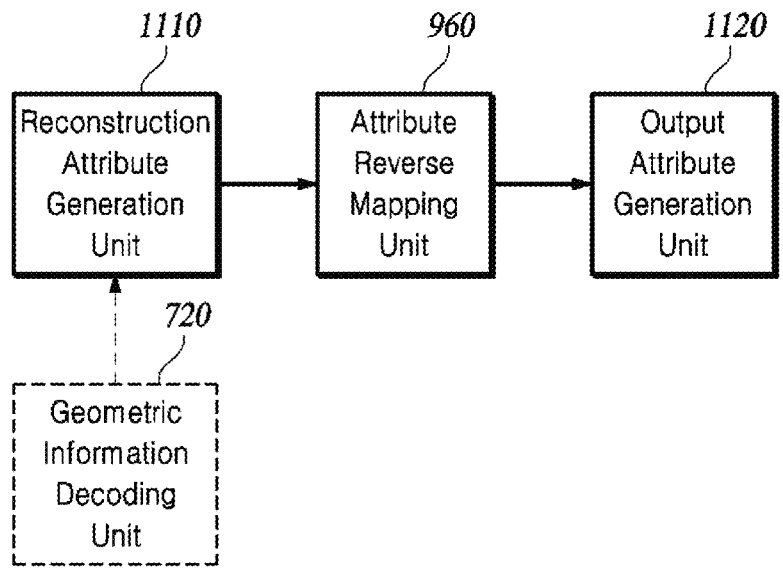
FIG. 11 is a conceptual block diagram illustrating an attribute information decoding unit according to another embodiment of the present disclosure.

FIG. 11 is a conceptual block diagram illustrating an attribute information decoding unit according to another embodiment of the present disclosure.

The attribute information decoding unit 730 according to the present embodiment may be expressed around the attribute reverse mapping unit 960, as illustrated in FIG. 11. For example, the attribute information decoding unit 730 includes a reconstruction attribute generation unit 1110, an attribute reverse mapping unit 960, and an output attribute generation unit 1120. Here, the reconstruction attribute generation unit 1110 includes the attribute entropy decoding unit 910, the attribute inverse quantization unit 920, the attribute summing unit 930, the attribute inverse transform prediction unit 940, and the storage unit 950, as described above. The output attribute generation unit 1120 includes the color space inverse conversion unit 970 and the dynamic range scaling unit 980, as described above.

Accordingly, the reconstruction attribute generation unit 1110 decodes and de-quantizes the bitstream of the attribute information to generate reconstructed attribute information.

The output attribute generation unit 1120 performs a color space inversion and a dynamic range inversion to generate output attribute information from the mapping attribute information.

The following describes a method of encoding geometry information of points, which is performed by the geometric information encoding unit 310 in the point cloud encoding device 210.

Figure 12:
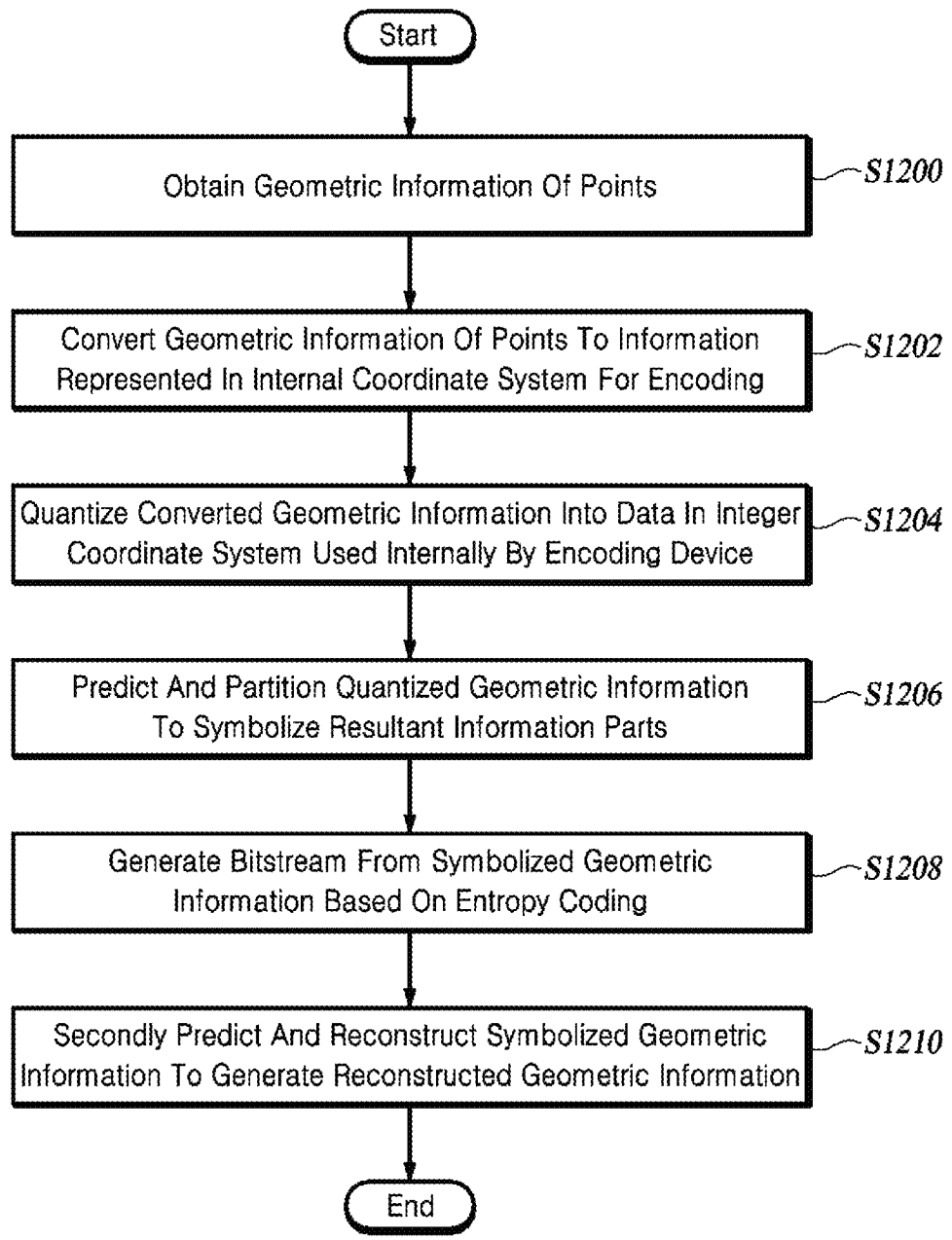
FIG. 12 is a flowchart of a geometric information encoding method according to at least one embodiment of the present disclosure.

FIG. 12 is a flowchart of a geometric information encoding method according to at least one embodiment of the present disclosure.

The geometric information encoding unit 310 obtains the geometric information of the points (S1200).

The geometric information encoding unit 310 converts the geometric information of the points in the world coordinates into information expressed in the internal coordinate system for encoding (S1202).

The geometric information encoding unit 310 quantizes the converted geometric information into data in an integer coordinate system for use inside the encoding device (S1204).

The geometric information encoding unit 310 predicts and partitions the quantized geometric information to symbolize the resultant information parts (S1206).

The geometric information encoding unit 310 generates a bitstream from the symbolized geometric information based on entropy coding (S1208).

The geometric information encoding unit 310 secondly predicts and reconstructs the symbolized geometric information to generate reconstructed geometric information (S1210). The geometric information encoding unit 310 may deliver the reconstructed geometric information to the attribute information encoding unit 320.

The following describes a method for encoding attribute information of points, performed by the attribute information encoding unit 320 in the point cloud encoding device 210.

Figure 13:
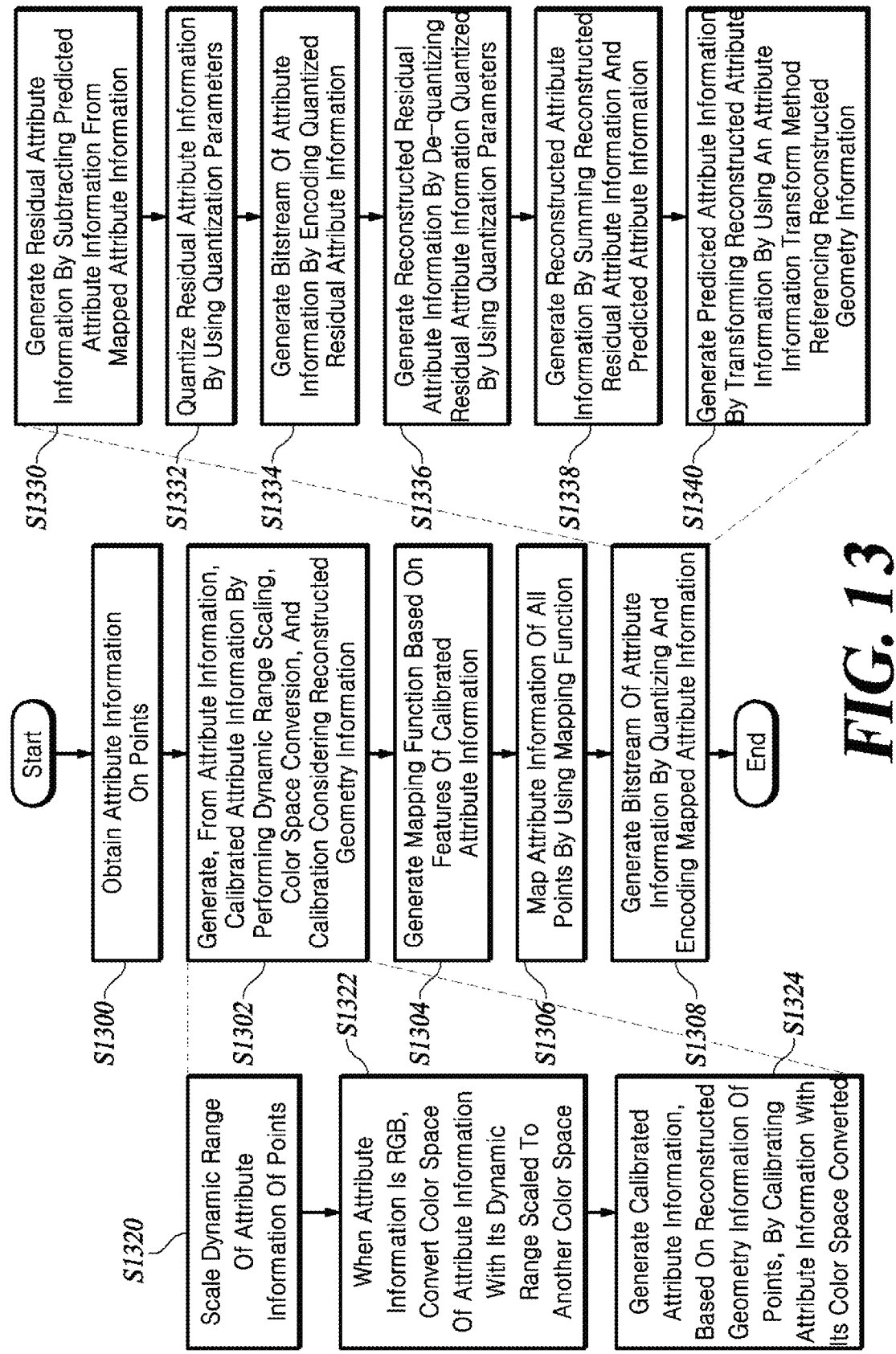
FIG. 13 is a flowchart of an attribute information encoding method according to at least one embodiment of the present disclosure.

FIG. 13 is a flowchart of an attribute information encoding method according to at least one embodiment of the present disclosure.

The attribute information encoding unit 320 obtains the attribute information of the points (S1300).

The attribute information encoding unit 320 generates calibrated attribute information from the attribute information by performing a dynamic range scaling, a color space conversion, and a calibration considering the reconstructed geometry information (S1302).

Step S1302 performed by the attribute information encoding unit 320 has more detailed operation steps (Steps S1320 to S1324) as follows.

The attribute information encoding unit 320 scales the dynamic range of the attribute information of the points (S1320).

The attribute information encoding unit 320, in response to a situation when the attribute information is RGB, converts the color space of the attribute information with its dynamic range scaled to another color space (S1322). The attribute information encoding unit 320 may not perform the color space conversion if the attribute information is of a type not related to a color space.

The attribute information encoding unit 320 generates calibrated attribute information based on the reconstructed geometry information of the points, by calibrating the attribute information with its color space converted (S1324). Here, the reconstructed geometry information is provided from the geometric information encoding unit 310.

The attribute information encoding unit 320 generates a mapping function based on the features of the calibrated attribute information (S1304). The mapping function may be embedded in information from the high level, such as SPS or APS, encoded into a bitstream, and transmitted to the decoding unit 220.

For example, the mapping function may be a linear function. The mapping function may also be a nonlinear function based on parameters. Alternatively, the mapping function may be a piecewise linear function that includes N intervals.

The attribute information encoding unit 320 maps the attribute information of all points by using a mapping function (S1306).

The attribute information encoding unit 320 quantizes and encodes the mapped attribute information to generate a bitstream of attribute information (S1308).

Step S1308 performed by the attribute information encoding unit 320 has more detailed operation steps (Steps S1330 to S1340) as follows.

The attribute information encoding unit 320 subtracts the predicted attribute information from the mapped attribute information to generate the residual attribute information (S1330).

The attribute information encoding unit 320 quantizes the residual attribute information by using quantization parameters (S1332).

The attribute information encoding unit 320 encodes the quantized residual attribute information to generate a bitstream of attribute information (S1334).

The attribute information encoding unit 320 de-quantizes the quantized residual attribute information by using the quantization parameters to generate reconstructed residual attribute information (S1336).

The attribute information encoding unit 320 generates reconstructed attribute information by summing the reconstructed residual attribute information and the predicted attribute information (S1338).

The attribute information encoding unit 320 utilizes an attribute information transform method referencing the reconstructed geometry information for transforming the reconstructed attribute information to generate the predicted attribute information (S1340).

The following describes a method for encoding attribute information of points, performed by a geometric information decoding unit 720 in the point cloud decoding device 220.

Figure 14:
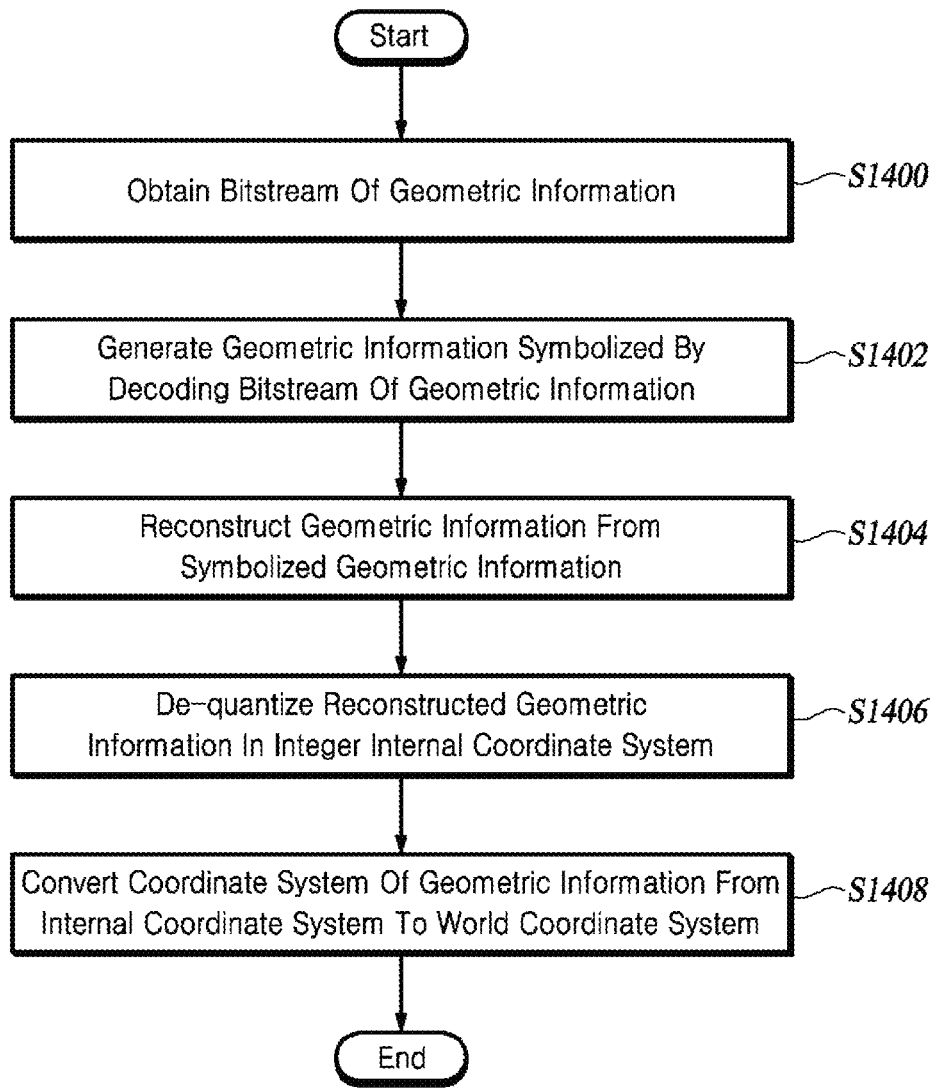
FIG. 14 is a flowchart of a geometric information decoding method according to at least one embodiment of the present disclosure.

FIG. 14 is a flowchart of a geometric information decoding method according to at least one embodiment of the present disclosure.

The geometric information decoding unit 720 obtains a bitstream of geometric information (S1400).

The geometric information decoding unit 720 decodes the bitstream of geometric information to generate symbolized geometric information (S1402).

The geometric information decoding unit 720 reconstructs the geometric information from the symbolized geometric information (S1404). The geometric information decoding unit 720 may reconstruct the geometric information by using a prediction method based on the already reconstructed geometric information, such as a planar prediction, a neighboring prediction, or the like. The geometric information decoding unit 720 may deliver the reconstructed geometric information to the attribute information decoding unit 730.

The geometric information decoding unit 720 de-quantizes the reconstructed geometric information in an integer internal coordinate system (S1406).

The geometric information decoding unit 720 utilizes information on the world coordinate system delivered from the high level to convert the coordinate system of the geometric information from the internal coordinate system to the world coordinate system (S1408). The geometric information decoding unit 720 generates geometric information converted to data in the world coordinate system.

The following describes a method of decoding attribute information of points, performed by the attribute information decoding unit 730 in the point cloud decoding device 220.

Figure 15:
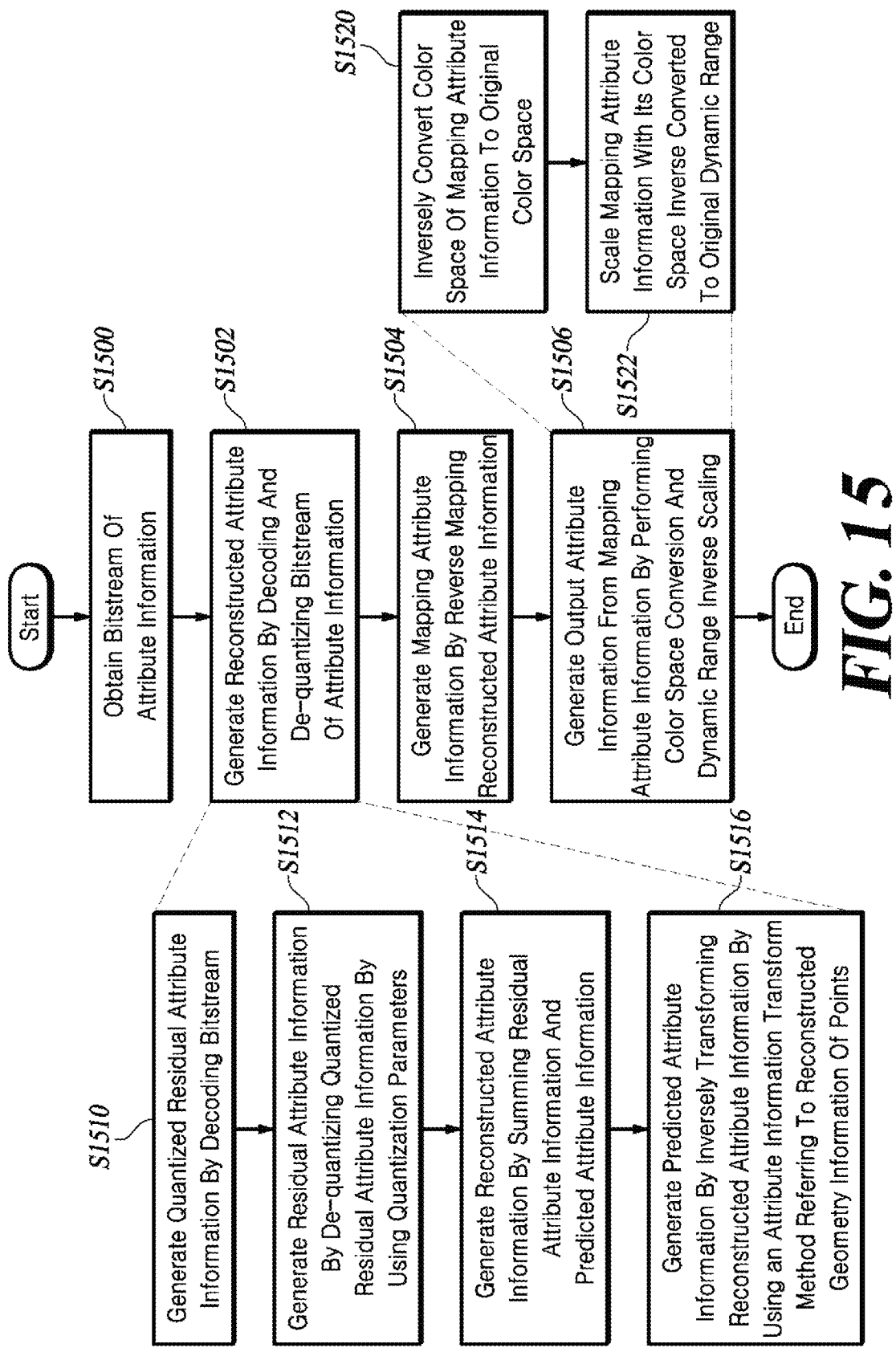
FIG. 15 is a flowchart of an attribute information decoding method according to at least one embodiment of the present disclosure.

FIG. 15 is a flowchart of an attribute information decoding method according to at least one embodiment of the present disclosure.

The attribute information decoding unit 730 obtains a bitstream of attribute information (S1500).

The attribute information decoding unit 730 decodes and de-quantizes the bitstream of the attribute information to generate reconstructed attribute information (S1502).

Step S1502 performed by the attribute information decoding unit 730 has more detailed operation steps (Steps S1510 to S1516) as follows.

The attribute information decoding unit 730 decodes the bitstream to generate quantized residual attribute information (S1510).

The attribute information decoding unit 730 de-quantizes the quantized residual attribute information by using the quantization parameters to generate residual attribute information (S1512).

The attribute information decoding unit 730 generates the reconstructed attribute information by summing the residual attribute information and the predicted attribute information (S1514).

The attribute information decoding unit 730 utilizes an attribute information transform method referring to the reconstructed geometry information of the points for inversely transforming the reconstructed attribute information to generate the predicted attribute information (S1516). Here, the reconstructed geometry information is provided from the geometric information decoding unit 720.

The attribute information decoding unit 730 generates the mapping attribute information by reverse mapping the reconstructed attribute information by using the mapping function delivered from the high level (S1504). The mapping function delivered from the high level may be a linear function, a piecewise linear function, or a nonlinear function.

The attribute information decoding unit 730 performs a color space inversion and a dynamic range inversion to generate output attribute information from the mapping attribute information (S1506).

Step S1506 performed by the attribute information decoding unit 730 has more detailed operation steps (Steps S1520 to S1522) as follows.

The attribute information decoding unit 730 inverse converts the color space of the mapping attribute information to the original color space by using the information on the original color space delivered from the high level (S1520). At this time, to inverse convert the color space, the attribute information decoding unit 730 may use the original color space information delivered from the high level. Additionally, when the encoding device 210 has made no color space conversion, this process may omit the color space inverse conversion.

The attribute information decoding unit 730 utilizes the original dynamic range information received from the high level to scale the mapping attribute information with its color space inverse converted to the original dynamic range (S1522). By scaling the attribute information to the original dynamic range, the attribute information decoding unit 730 may generate the output attribute information.

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in this specification are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the present disclosure is not limited by the illustrations. Accordingly, those having ordinary skill in the art to which this disclosure pertains should understand that the scope of the present disclosure is not to be limited by the above explicitly described embodiments but by the claims and equivalents thereof.

REFERENCE NUMERALS

310: geometric information encoding unit
320: attribute information encoding unit
5040: mapping function generation unit
5050: attribute forward mapping unit
720: geometric information decoding unit
730: attribute information decoding unit
960: attribute reverse mapping unit

What is claimed is:

1. A method performed by a point cloud decoding apparatus by decoding attribute information of a set of points, the method comprising:
   obtaining a bitstream of the attribute information;
   generating reconstructed attribute information by decoding and inverse quantizing the bitstream of the attribute information;
   generating mapping attribute information by reverse mapping the reconstructed attribute information by using a mapping function received from a high level; and
   generating output attribute information from the mapping attribute information by performing a color-space inverse conversion and a dynamic range inverse scaling,
   wherein the mapping function is generated in a point cloud encoding apparatus by performing:
      obtaining attribute information of the points;
      generating calibrated attribute information from the attribute information by performing a dynamic range scaling and a color space conversion;
      dividing an original intensity of the calibrated attribute information into N intervals;
      calculating an interval length of the N intervals from a mapped intensity by using at least one of a ratio of points included in each of the N intervals, a dynamic range of the original intensity, or a dynamic range of the mapped intensity; and
      generating a slope for each of the N intervals by calculating a ratio between an interval length of the original intensity and the interval length of the mapped intensity.

2. The method of claim 1, wherein the attribute information comprises:
   color information of a point cloud, lidar information that generated the point cloud, a frame index, and a point acquisition time in whole or in part.

3. The method of claim 1, wherein generating the mapping attribute information comprises:
   when the mapping function is a reverse mapping function, reverse mapping the reconstructed attribute information by using the reverse mapping function; and
   when the mapping function is a forward mapping function, deriving from the forward mapping function a corresponding reverse mapping function and then reverse mapping the reconstructed attribute information by using the derived reverse mapping.

4. The method of claim 1, wherein generating the mapping attribute information comprises:
   when the mapping function is a piecewise linear function, deriving, from a slope of each of intervals or a length of an interval in a mapped domain, a linear function of each of the N intervals.

5. The method of claim 2, wherein generating the mapping attribute information is omitted when the reconstructed attribute information has a type that is the frame index and the point acquisition time.

6. The method of claim 1, wherein generating the reconstructed attribute information further comprises:
   generating the predicted attribute information by inversely transforming the reconstructed attribute information by using an attribute information transform method referencing reconstructed geometry information of the points,
   wherein the reconstructed geometry information is provided by a geometry information decoding device in the point cloud decoding apparatus.

7. The method of claim 1, wherein generating the output attribute information comprises:
   inverse converting, by using information on an original color space received from the high level, a color space of the mapping attribute information to the original color space; and
   scaling, by using information on an original dynamic range received from the high level, the mapping attribute information with the color space inverse converted, to the original dynamic range.

8. A method performed by a point cloud encoding apparatus for encoding attribute information of a set of points, the method comprising:
  obtaining the attribute information of the points;
  generating calibrated attribute information from the attribute information by performing a dynamic range scaling and a color space conversion;
  generating a mapping function based on features of the calibrated attribute information;
  generating, by using the mapping function, mapped attribute information by forward mapping the calibrated attribute information; and
  generating a bitstream of the attribute information by quantizing and encoding the mapped attribute information,
  wherein generating the mapping function comprises:
    dividing an original intensity of the calibrated attribute information into N intervals;
    calculating an interval length of the N intervals from a mapped intensity by using at least one of a ratio of points included in each of the N intervals, a dynamic range of the original intensity, or a dynamic range of the mapped intensity; and
    generating a slope for each of the N intervals by calculating a ratio between an interval length of the original intensity and the interval length of the mapped intensity.

9. The method of claim 8, wherein generating the mapping function further comprises:
  generating a piecewise linear function by connecting slopes of every one of the N intervals.

10. The method of claim 8, wherein the mapping function is transferred to a point cloud decoding apparatus while embedded in information of a high level.

11. The method of claim 8, wherein generating the calibrated attribute information comprises:
  scaling a dynamic range of the attribute information of the points;
  when the attribute information is RGB color information, transforming a color space of the attribute information with the dynamic range scaled to another color space; and
  calibrating, based on reconstructed geometry information of the points, the attribute information with the color space converted to generate the calibrated attribute information,
  wherein the reconstructed geometry information is provided by a geometric information encoding device in the point cloud encoding apparatus.

12. The method of claim 11, wherein generating the bitstream of the attribute information comprises:
  generating residual attribute information by subtracting predicted attribute information from the mapped attribute information;
  quantizing the residual attribute information by using a quantization parameter;
  encoding the quantized residual attribute information to generate the bitstream of the attribute information;
  generating reconstructed residual attribute information by de-quantizing the quantized residual attribute information by using the quantization parameter;
  generating reconstructed attribute information by summing the reconstructed residual attribute information and the predicted attribute information; and
  generating the predicted attribute information by transforming the reconstructed attribute information by using an attribute information transform method referencing the reconstructed geometry information.

13. A method of storing a bitstream of a point cloud into a non-transitory computer-readable recording medium, wherein the bitstream is generated by a method performed by a point cloud encoding apparatus for encoding attribute information of a set of points, wherein the method comprises:
  obtaining the attribute information of the points;
  generating calibrated attribute information from the attribute information by performing a dynamic range scaling and a color space conversion;
  generating a mapping function based on features of the calibrated attribute information;
  generating, by using the mapping function, mapped attribute information by forward mapping the calibrated attribute information; and
  generating a bitstream of the attribute information by quantizing and encoding the mapped attribute information,
  wherein generating the mapping function comprises:
    dividing an original intensity of the calibrated attribute information into N intervals;
    calculating an interval length of the N intervals from a mapped intensity by using at least one of a ratio of points included in each of the N intervals, a dynamic range of the original intensity, or a dynamic range of the mapped intensity; and
    generating a slope for each of the N intervals by calculating a ratio between an interval length of the original intensity and the interval length of the mapped intensity.

14. The method of claim 1, wherein generating the reconstructed attribute information comprises:
  generating quantized residual attribute information by decoding the bitstream;
  generating residual attribute information by de-quantizing the quantized residual attribute information by using a quantization parameter; and
  summing the residual attribute information and a predicted attribute information to generate the reconstructed attribute information.

* * * * *